Sept. 18, 1945.  B. C. LORD  2,384,939
PORTABLE LADDER AND ADJUSTABLE PLATFORM ASSEMBLY
Filed Jan. 29, 1945  4 Sheets-Sheet 1
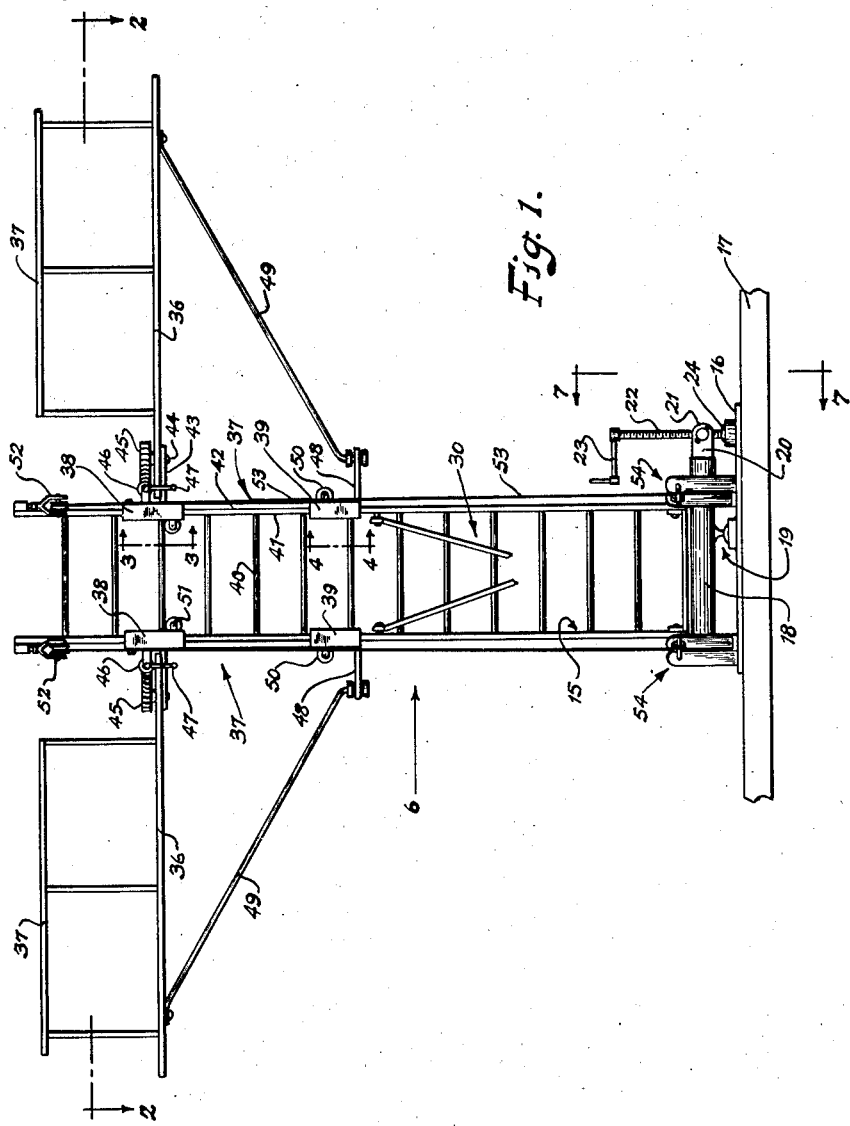
Inventor
Byron C. Lord.
By *Clarence A. O'Brien and Harvey B. Jacobson*
Attorneys Sept. 18, 1945.  B. C. LORD  2,384,939
PORTABLE LADDER AND ADJUSTABLE PLATFORM ASSEMBLY
Filed Jan. 29, 1945  4 Sheets-Sheet 2
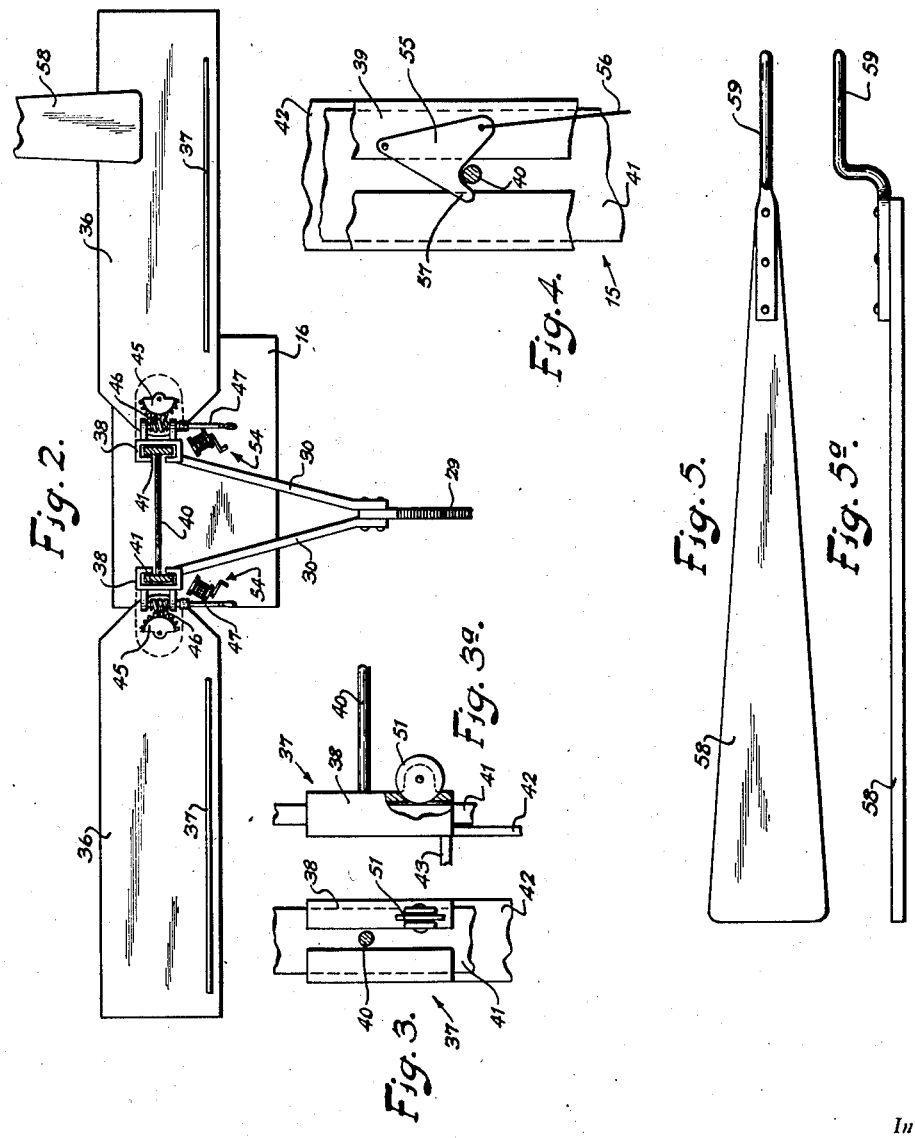
Inventor
Byron C. Lord.
By *Clarence A. O'Brien and Harvey B. Jacobson*
Attorneys Sept. 18, 1945.　　　　B. C. LORD　　　　2,384,939
PORTABLE LADDER AND ADJUSTABLE PLATFORM ASSEMBLY
Filed Jan. 29, 1945　　　4 Sheets-Sheet 3
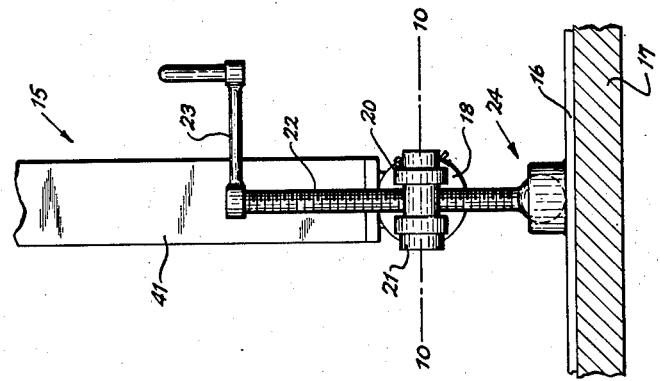
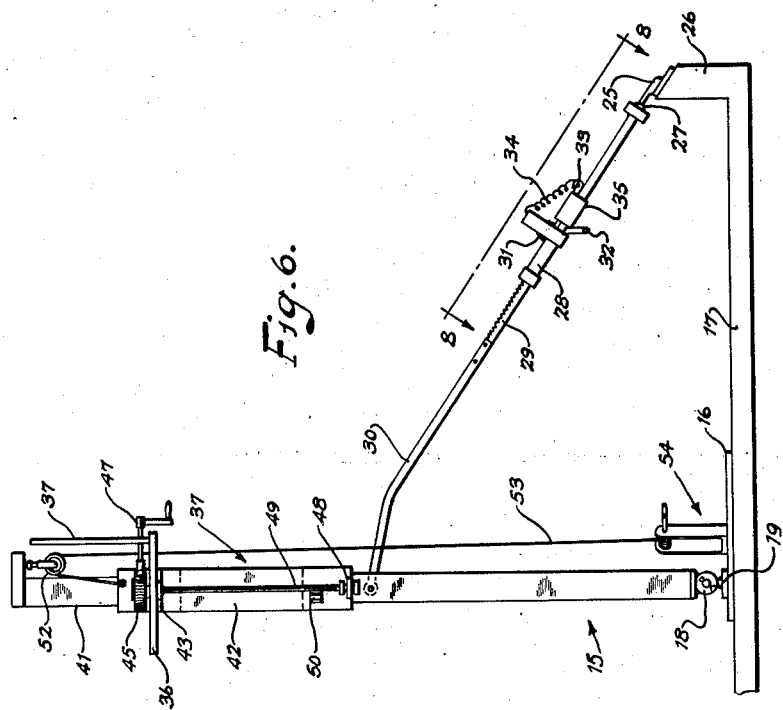
Inventor
Byron C. Lord.
By *Clarence A. O'Brien and Harvey B. Jacobson*
Attorneys Sept. 18, 1945.   B. C. LORD   2,384,939
PORTABLE LADDER AND ADJUSTABLE PLATFORM ASSEMBLY
Filed Jan. 29, 1945   4 Sheets-Sheet 4
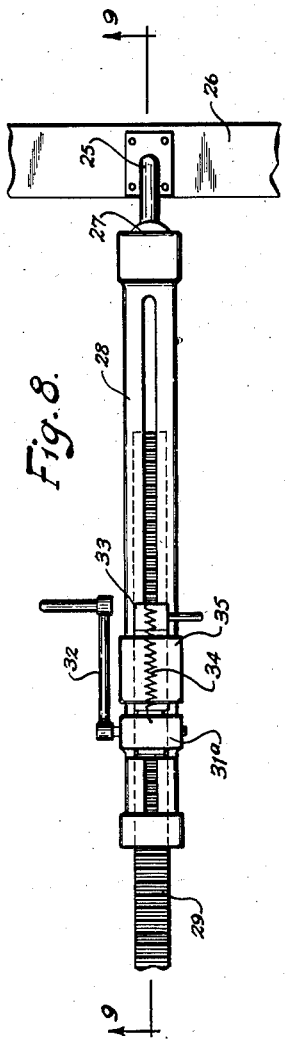
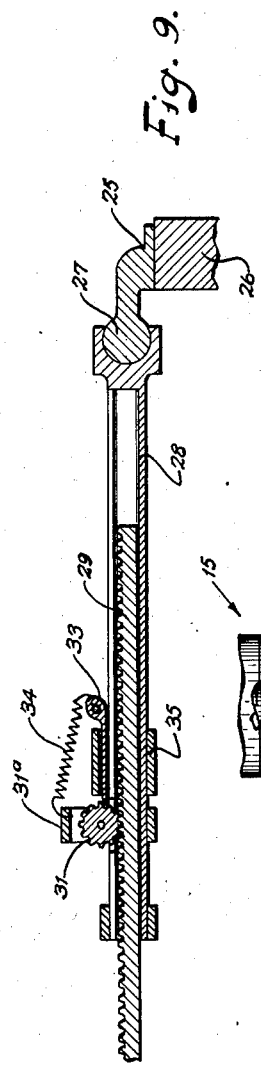
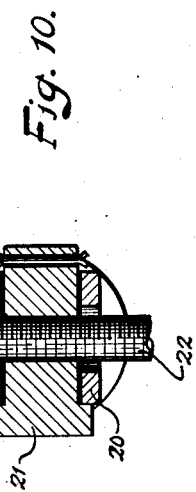
Inventor
Byron C. Lord.
By Clarence A. O'Brien
and Harvey B. Jacobson
Attorneys Patented Sept. 18, 1945

2,384,939

UNITED STATES PATENT OFFICE 2,384,939

PORTABLE LADDER AND ADJUSTABLE PLATFORM ASSEMBLY

Byron C. Lord, Clayton, Mich.

Application January 29, 1945, Serial No. 575,095

8 Claims. (Cl. 304—29)

This invention relates to a novel and improved portable ladder and an associated adjustable platform structure, the arrangement being such as to provide a multiple-purpose scaffold which is especially, but not necessarily, adapted for use by fruit pickers in apple orchards and the like.

Although the complete structure is aptly susceptible of use by painters and other employing scaffolds, it is, as before stated, primarily intended for use in orchards and will be primarily studied and considered in the light of the latter implications. To this end, it will be noted that an essential phase of the invention has to do with the ladder, this being secured to a portable base by a universal joint and having means associated therewith to permit it to be tilted toward and from the tree, or tilted in opposite directions at right angles to the tree, this with the thought of maintaining the ladder close to the limbs of the tree at all times and also in a substantially perpendicular position regardless of the fact that the supporting base, such as a tractor or the like, may be sitting on uneven ground.

Another object of the invention has to do with the universally mounted ladder on a portable base, such as a truck, tractor or the like, there being a pair of wing-like horizontal platforms forming walkways, these being carried by special adapter devices shiftably mounted on the rails of the ladder, and said platforms having independent pivotal connections and associated means, whereby they may be swung in horizontal planes about vertical axes, permitting them to occupy positions sufficiently close to the tree to nest in and hug the limbs. Thus, the platforms are movable in conjunction with the tiltable ladder and are also independently adjustable, whereby to provide a highly adaptable and practicable platform or scaffold structure.

More specifically, novelty is predicated on the platform and adapter unit which connects said platform to the vertical rails of the ladder, these fixtures being slid up and down by simple lifting and lowering cables and operating winches therefor, this providing another contributing factor to the adjustability and suitability of the structure which I consider as appropriate in fulfilling my aims and the requirements of the trade.

Other features and advantages will become more readily apparent from the following description and the accompanying illustrative drawings.

In the drawings, wherein like numerals are employed to designate like parts throughout the views:

Figure 1 is an elevational view showing an adjustable, portable ladder and the associated independently adjustable platform means assembled for use as a fruit picker's scaffold.

Figure 2 is a horizontal section taken approximately on the plane of the line 2—2 of Figure 1, looking in the direction of the arrows.

Figure 3 is a slightly enlarged detail section taken approximately on the plane of the line 3—3 of Figure 1.

Figure 3a is an edge view of Figure 3, that is, a view observing the same in a direction from right to left.

Figure 4 is a section, slightly enlarged, on the plane of the line 4—4 of Figure 1, looking in the direction of the arrows.

Figure 5 and 5a are detail plan and edge elevations of an auxiliary extension plank used in connection with the platforms.

Figure 6 is an elevational view, which may be said to be an edge elevation, or perhaps an end view, this disclosing the complete assemblage and looking in the direction of the arrows 6 in Figure 1.

Figure 7 is an enlarged detailing sectional view taken approximately on the plane of the line 7—7 of Figure 1.

Figure 8 is an enlarged view showing a fragmentary portion of the extensible and retractible brace and adjusting means for the ladder, this being of the parts indicated at 8—8 in Figure 6.

Figure 9 is a longitudinal sectional view taken approximately on the plane of the line 9—9 of Figure 8.

Figure 10 is an enlarged view of the side tilt adjusting and retaining means for the ladder, this being on the line 10—10 of Figure 7.

Referring to the drawings by distinguishing reference numerals, it will be seen that the ladder is generally denoted by the numeral 15, this associated with a base plate 16 on a support 17. This support may be a part of a tractor, or a part of a simple wheeled cart or any other portable device sufficient to conveniently bring the ladder in toward and then shifted around the tree. The lower part of the ladder is attached to a cylindrical mount 18 having a ball and socket connection 19 connected with the base 16 and providing a universal mount for the ladder as a unit. On one end of the mount 18 is a suitable yoke 20 having a headed pine 21 (see Fig. 10) mounted for adjustment therein. This pin is in effect a nut and is threaded to accommodate the screw-threaded adjusting screw 22. The ladder is provided (see Figs. 1 and 7) with a hand crank 23 and has ball and socket connection, as at 24, with the base plate. As the ladder is rigidly connected to the cylindrical mount, and the mount is on the universal joint 19, it is evident that turning the hand crank 23 actuates the feed screw 22, thus swinging the ladder from side to side so that regardless of the tilted plane of the support 17, the ladder may be maintained in a substantially perpendicular position. This is thus the regulating and adjusting means to maintain the ladder at the proper vertical angle in respect to the ground notwithstanding irregularities and the uneven position of the tractor or other part carrying the support 17.

In addition to having the sidewise tilt of the ladder for vertical adjustment purposes, I provide means to regulate the angularity or position of the ladder toward and from the tree (not shown). This means is shown in Figure 6, being, mechanically speaking, a sort of a "turnbuckle" or jack structure. The details are brought out on a larger scale in Figures 8 and 9. Referring to this means, it will be seen that it comprises a ball jointing member 25 rigidly mounted atop the extension 26, this having ball and socket connection, as at 27, with a tubular sheath 28. A toothed rack bar 29 is telescopically mounted in the sheath and the rack bar is connected with the fork arms 30 pivotally connected to the side rails of the ladder. I provide a pinion 31 adjusted by a hand crank 32 and this pinion is retained by a pawl 33 having a retaining spring 34, the pawl being slidable through a suitable accommodation fixture 35 (see Figs. 8 and 9 in particular). It is evident that this arrangement provides a sort of an adjusting jack for moving the ladder toward and from the tree and the ball and socket joint 27 accommodates the sidewise tilting positions of said ladder.

I desire to call attention now to the platform assembly. The platforms are the same in construction and a description of one will suffice for both. Each platform is denoted by the numeral 36 and has a suitable hand rail 37 along its rear edge. This is on the edge remote from the tree, leaving the opposite edge free to permit pickers to have convenient access to the fruit on the limbs of the tree. An adapter device or fixture 38, unitarily speaking, is provided for shiftably and adjustably mounting the platform on the adjacent rail of the latter. Each fixture comprises upper and lower sleeves 38 and 39 which slidably embrace the side rails and are slotted to clear the rungs 40 between said side rails 41. Actually, the sleeves are connected together by a strap or web 42. The upper sleeve is provided with a lateral extension 43 to which the inner end of the platform is pivotally connected, as at 44. The pivot is provided with a gear sector 45 having a worm 46, the latter on the sleeve, operatively connected therewith, the worm being provided with a hand crank 47. Thus, the platform may be swung on a vertical axis in horizontal plane with respect to the ladder. The lower sleeve is provided with a similar lateral extension 48 to which a diagonal brace 49 is pivotally connected. This lower sleeve is also provided with a stabilizing and anti-friction roller 50 which runs against the outer surface of the ladder rail 41. The upper sleeve is also provided with a similar roller 51, but this engages the inner surface of the ladder rail. It has been found that due to the stress and strain of the weight of the user on the walkway or platform 36, these rollers carried by the sleeves and slidably engaging the ladder rails prevent binding and permit the entire assembly, the platform assembly, to ride up and down on the rails. To accomplish this hoist, I provide suitable sheaves 52 having cables 53 connected therewith. The lower ends of the cables are wound on suitable windlass devices 54. Thus, the entire platform assembly can be made to rise and fall and the platforms can be placed on the same plane with each other or one can be placed in one elevation and the other one at another elevation, depending on the requirements of the particular job undertaken.

Reference being had to Figure 4, it will be seen that each adapter unit 37 is provided, at least on one of the sleeves, with a latch, that is, a safety latch 55. This is pivotally mounted and operated by a pull cord 56. The latch is substantially V-shaped and has a detent 57 to engage the round or rung of the ladder. This is an automatic safety feature and prevents dropping of the platforms in case the windlass-controlled cables should break.

It is sometimes difficult to get the platforms in close to certain awkwardly arranged limbs of the tree. I find, therefore, that it is desirable to have a sort of an extension plank or platform. I have shown one of these in Figures 5 and 5a. Each extension plank is denoted by the numeral 58 and has an offset L-shaped bracket 59 to rest on the main platform. Due to this shape of the plank and the bracket, it is possible to simply rest the plank at any desired angle on the main platform and to position the hanger bracket 59 of the plank 58 on one of the limbs to provide what might be called an auxiliary catwalk. Consequently, any apples which cannot be reached conveniently from the adjusted main platforms can be picked by walking in toward the trunk of the tree on the hand-placed planks 58.

In using the device, the tractor, truck or whatever other mobile vehicle is employed is moved up toward the tree and then the ladder 15, if necessary, is adjusted so that it is substantially perpendicular or at whatever angle is best suited for the inclination of the tree. The ladder can then be swung in close to the tree and the platforms raised or lowered to the desired elevation. They, too, can be swung in by the worm and gear sector arrangement so that they will hug the tree limbs. Thus, all necessary adjustments are incorporated in the simple platform and ladder assembly to accommodate the ends desired.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a structural assemblage of the class described, a portable relatively fixed support, a ladder, means rigidly mounted on the bottom of the ladder and connected to the support by a universal joint, a crank-equipped universally mounted feed screw on said support, and an operating and adjusting connection between the feed screw and ladder for adjusting the ladder in predetermined directions in respect to the support, together with a pinion and rack bar device, said rack bar being connected with the ladder and also universally connected with the support.

2. In a structural assemblage of the class described, a relatively stationary support adapted to be mounted on a wheeled base, tractor or the like, a fruit-picking ladder, a ball and socket connection between the lower portion of the ladder and said support, fork arms pivotally connected to the side rails of the ladder at intermediate points of said side rails, a rack bar connected to said fork arms, a sheath, said rack bar being slidable in said sheath, a pinion on the sheath for operating the rack bar, and a bracket for connection with said support, said bracket having a universal joint associated therewith.

3. In a structural assemblage of the class described, a relatively stationary support adapted to be mounted on a wheeled base, tractor or the like, a fruit-picking ladder, a ball and socket connection between the lower portion of the ladder and said support, fork arms pivotally connected to the side rails of the ladder at intermediate points of said side rails, a rack bar connected to said fork arms, a sheath, said rack bar being slidable in said sheath, a pinion on the sheath for operating the rack bar, and a bracket for connection with said support, said bracket having a universal joint associated therewith, a vertical feed screw having a ball and socket connection at its lower end with said support, said feed screw being provided with a hand crank, a headed pin mounted on said feed screw, and means operatively connecting said headed pin with the adjacent portion of the ladder for adjusting the ladder in directions to permit it to be elevated in a position substantially perpendicular to a horizontal plane.

4. In a fruit picker's ladder and platform assembly, a ladder, a pair of platforms extending from opposite sides of the ladder at substantial right angles to the longitudinal rails of the ladder, adapter devices slidably mounted on said rails, said platforms being pivotally connected to said adapted devices, means for swinging the platforms on said pivotal connections toward and from the tree, sheaves on the ladder rails, cables trained over said sheaves and connected to said adapter devices, and winches with which the lower ends of the cables are connected.

5. A fruit picker's ladder and platform assembly of the class described comprising a portable support, a ladder universally mounted on said support, selectively usable independently mounted adjusting devices for moving the ladder toward and from the tree, and positioning and keeping the ladder at the desired perpendicular placements with respect to the ground, adapter devices slidably mounted on the ladder rails, a pair of platforms pivotally connected to said adapter devices, and raising and lowering means for the adapter devices.

6. As a component part of a structure of the class described, a sleeve provided with an anti-friction roller, an extension on said sleeve, a platform pivotally connected to said extension, said platform being provided with a guard rail, a gear sector carried by the pivotal connection, a worm carried by the sleeve and provided with a crank, said worm being connected with said gear sector.

7. In a structure of the class described, a pair of longitudinal sleeves, a connecting plate adjoining said sleeves, said sleeves being adapted to be slidably mounted on a side rail on a fruit-picking ladder, said sleeves being provided with anti-friction rollers arranged on alternate sides to engage opposite faces of the rail, a platform connected with one sleeve, adjusting means for said platform, a brace connected with the platform and also connected at its inner end with the remaining sleeve.

8. A fruit picker's ladder and platform assemblage of the class described comprising a portable but relatively fixed support, a picker's ladder having means at its bottom universally mounting same on said support to permit it to be swung toward and from a tree and from side to side to assume a proper perpendicular position in respect to the inclination of the ground and support, a manually regulated device for controlling the universal joint in order to move the ladder in various directions in respect to the plane of the support and the adjacent tree, additional mechanical manually operable means for maintaining the ladder at the prescribed perpendicular placement position, a pair of platforms extending from opposite sides of the ladder rails and at approximate right angles to said rails, said platforms being provided along their longitudinal edges with guard rails, said guard rails being positioned on the edges remote from the tree to facilitate use and maneuvering by the pickers, adapter devices independently and slidably mounted on the respective rails, said platforms being pivotally connected with said adapter devices, and manually regulated mechanical means for adjusting and holding the platforms in positions desired, whereby to permit said platforms to be disposed in positions converging with respect to each other and the intervening ladder and to thus assume places of vantage close to the limbs of the tree.

BYRON C. LORD.